United States Patent [19]

Schundehutte

[11] 3,869,439

[45] Mar. 4, 1975

[54] PIGMENTS COMPRISING SALTS OR COMPLEXES OF POLYVALENT METALS AND AZO-BARBITURIC ACID

[75] Inventor: Karl-Heinz Schundehutte, Opladen, Germany

[73] Assignee: Farbenfabriken Bayer Aktiengesellschaft, Leverkusen, Germany

[22] Filed: Dec. 28, 1971

[21] Appl. No.: 213,221

[30] Foreign Application Priority Data
Dec. 28, 1970 Germany............................ 2064093

[52] U.S. Cl.................... 260/146 D, 8/42 R, 8/71, 106/23, 106/288 Q, 106/300, 106/308 R, 106/308 N, 106/308 Q, 117/138.8 R, 117/138.8 B, 117/138.8 F, 117/143 R, 117/144, 117/154, 260/37 R, 260/37 NP, 260/40 R, 260/40 TN, 260/41 C, 260/41.5 R, 260/154

[51] Int. Cl.. C09b 45/18, C09b 45/20, C09b 45/22
[58] Field of Search........................ 260/146 D, 154

[56] References Cited
UNITED STATES PATENTS

| | | |
|---|---|---|
| 1,606,209 | 11/1926 | De Montmollin et al. ..... 260/146 D |
| 1,851,118 | 3/1932 | Straub et al. ....................... 260/149 |
| 1,908,571 | 5/1933 | Straub et al. .................... 260/146 D |
| 1,936,276 | 11/1933 | Straub et al. .....................260/146 D |
| 2,230,686 | 2/1941 | Holzach et al................. 260/149 X |
| 2,901,473 | 8/1959 | Steinemann..................... 260/146 R |
| 2,993,884 | 7/1961 | Ruegg et al......................... 260/147 |
| 3,167,537 | 1/1965 | Menzel et al. .................. 260/154 X |
| 3,185,676 | 5/1965 | Klein et al. ..................... 260/145 A |

OTHER PUBLICATIONS

Ried et al., Liebigs Ann. Chem., volume 729, pages 119–123, (1969).

Primary Examiner—Floyd D. Higel
Attorney, Agent, or Firm—Plumley & Tyner

[57] ABSTRACT

Polyvalent metal salt or complex products of azobarbituric acid are prepared by heating azo-barbituric acid with a polyvalent metal salt in aqueous, aqueous-organic or organic medium or by heating a mixture of barbituric acid, suitable transferrers of azo groups and salts of polyvalent metals in suspension. The resulting salts or complexes of azo barbituric acid are suitable for use as pigments in varnishes, printing inks, emulsion paints, dyeing plastic in the mass, spin dyeing of fibers, and the printing of textiles and paper and are characterized by good color strength, light-fastness, fastness to solvents, and thermal stability.

4 Claims, No Drawings

PIGMENTS COMPRISING SALTS OR COMPLEXES OF POLYVALENT METALS AND AZO-BARBITURIC ACID

The subject-matter of the invention comprises reaction products of azo-barbituric acid of the formula

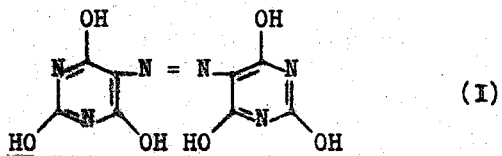

with derivatives of polyvalent metals, and processes for the production of these compounds.

The invention also relates to the use of these reaction products as pigment dyestuffs.

The subject-matter of the invention further comprises the use of the azo dyestuff of the formula (I) as pigment dyestuff.

Depending on the type of metal, the reaction products can be present in the form of metal salts or metal complex compounds.

The preferred metal salts or metal complexes of azo-barbituric acid [formula (I)] are the magnesium, barium, strontium, aluminium, zinc, manganese, iron, cobalt, nickel, copper and cadmium compounds as well as mixtures thereof.

In the case of magnesium, barium, strontium and aluminum compounds, it is very probable that the salts will be present.

The reaction products of azo-barbituric acid with barium, nickel, cadmium, copper and iron salts and their mixtures are particularly preferred.

Metal salts or metal complex compounds of azobarbituric acid with nickel, cadmium and copper salts and their mixtures are of particular importance.

The reaction products are prepared by treating azo-barbituric acid with salts of polyvalent metals; a preferred method is the synthesis of azo-barbituric acid in the presence of salts of polyvalent metals.

According to the invention, the following metal-yielding agents can be used as metal salts, inter alia: magnesium chloride, magnesium sulphate, calcium chloride, calcium acetate, calcium formate, barium chloride, barium nitrate, barium acetate, barium carbonate, strontium nitrate, manganese chloride, manganese sulphate, iron (III) chloride, iron(III) nitrate, iron-(II) sulphate, cobalt chloride, cobalt nitrate, cobalt sulphate, aluminium sulphate, aluminium nitrate, chromium(III) sulphate, chromium(III) nitrate, zinc chloride, zinc sulphate, zinc acetate, cadmium chloride, cadmium sulphate, cadmium nitrate, copper(II) sulphate, copper(II) chloride, copper(II) acetate and copper(II) formate.

It is also possible to use mixtures of these salts, which contain several of the metals mentioned above. The use of such salt mixtures is particularly recommended for achieving intermediate shades.

In order to prepare the new dyestuffs, one mol azo-barbituric acid, for example, is heated with about ½ to about 3 mol of the aforesaid salts in an aqueous, aqueous-organic or organic medium. Before or after the reaction in an aqueous medium, organic solvents may be added, such as formamide, N-methyl formamide, N,N-dimethyl formamide, acetamides, phosphoric acid amides, dioxan, acetone; pyridine and its derivatives, such as picolines, lutidines and collidine; mono- and polyhydric alcohols, such as methanol, ethanol, isobutanol, ethylene glycol; and organic acids, such as formic acid and acetic acid; solvents which are completely or partially water-miscible, or mixtures of these solvents, are therefore preferably used.

The starting dyestuff of the formula (I) can be obtained by the transfer of azo groups, for example, from barbituric acid and sulphonyl azides, or by coupling 5-diazo-barbituric acid with barbituric acid in alkaline media (lit. ref.: W. Ried and B. Peters, Liebigs Ann. Chem. 729 [1969] 119; M. Regitz, Angew. Chem. 79 [1967] 786).

In detail, the process according to the invention is carried out by heating mixtures of barbituric acid, suitable transferrers of azo groups, and salts of polyvalent metals in a weakly acidic to alkaline or ammoniacal, aqueous, aqueous-organic or organic suspension at 40° to 100°C. The pigment dyestuffs are formed in a high yield and with a good degree of purity. Azides suitable as transferrers of azo groups, are besides azido-alkanes and aromatic azo compounds, primarily compounds of the gernal formula $$R - N_3 \qquad (II)$$

in which
R stands for an acyl radical such as —CONH$_2$, —CO—NH— alkyl, —CON—(alkyl)$_2$, —COOR$_1$, R$_2$—SO$_2$— or a heterocyclic radical;
R$_1$ means an alkyl, aralkyl or aryl radical;
R$_2$ stands for amino groups, alkyl, aralkyl, aryl or heterocyclic radicals.

According to the invention, the term "alkyl radicals" refers to straight-chain and branched, substituted and unsubstituted alkyl radicals. The amino groups may be substituted in any way.

Azides suitable for the synthesis are, for example, carbamoyl azide, azido-formic acid methyl ester, azido-formic acid ethyl ester, dimethylamino-sulphonic acid azide, methyl-sulphonic acid azide, benzyl-sulphonic acid azide, benzene-sulphonic acid azide, o-toluene-sulphonic acid azide, m-toluene-sulphonic acid azide, p-toluene-sulphonic acid azide, 3-nitrobenzene-sulphonic acid azide, 2-chlorobenzenesulphonic acid azide, 4-chlorobenzene-sulphonic acid azide and 2-azido-3-ethylbenzothiazolium tetrafluoroborate.

Another process for the synthesis of the new dyestuffs in the presence of salts of polyvalent metals during the preparation of azo-barbituric acid consists in coupling 5-diazo-barbituric acid with barbituric acid in the presence of salts of polyvalent metals in alkaline media at an elevated temperature of about 40°C to 100°C, preferably 60°C to 80°C (lit. ref.: M. Regitz, Angew. Chemie 79 [1967] 786).

The process can be carried out in an aqueous, aqueous-organic or organic medium.

In the preparation of the reaction products of azobarbituric acid with salts of polyvalent metals, an addition of surface-active dispersing agents frequently proves particularly advantageous, such as solutions of alkali metal soaps of high-molecular fatty acids, resin soap glue, or also emulsions of fats, waxes, paraffins, fatty oils, or of plasticisers which are conventionally used in the varnish and plastics industries and which are prepared with the aid of soaps or other emulsifiers.

The salt formation or complex formation may also be carried out in the presence of substrates, for example, in the presence of aluminium hydroxide, barium sulphate or titanium dioxide.

A particularly soft grain can be obtained by boiling the isolated dyestuffs in an organic solvent such as those of the type mentioned above and/or in hydrophobic solvents such as benzene, toluene and 1,2-dichlorobenzene.

The azo-barbituric acid and its reaction products with derivatives of polyvalent metals are suitable for pigmenting varnished of any type; for the production of printing inks, distemper of emulsion paints; for the dyeing in the mass of synthetic, semi-synthetic or natural macromolecular materials such as, e.g., polyvinyl chloride, polystyrene, polyamide or polyethylene. They can also be used for the spin-dyeing of natural, regenerated or synthetic fibres, such as e.g. cellulose, polyester, polycarbonate, polyacrylonitrile or polyamide fibres, as well as for printing textiles and paper. Finely divided, stable aqueous pigment dispersions which can be used, for example, for the pigmentation of emulsion paints and paint compositions, for the colouring of paper, for the pigment-printing of textiles, or for the spin-dyeing of viscose, can be prepared from these pigments by grinding or kneading in the presence of non-ionic, anionic or cationic tensides.

The new dyestuffs, especially the reaction products of azo-barbituric acid with derivatives of polyvalent metals, are characterised by their great strength of colour, very good fastness to light, outstanding fastness to solvents and thermal stability.

EXAMPLE 1

A solution of 12.8 g barbituric acid in 200 ml of water and 20 ml of a 40% sodium hydroxide solution is mixed with an emulsion of 15 g strontium chloride hexahydrate, 9 g benzene-sulphonic acid azide and 1 g alkylsulphonate in 100 ml of water. The reaction mixture is subsequently heated to 60°C and vigorously stirred at the same temperature for 5 hours. The pH value is then adjusted to about 4 by the addition of 25 ml of 50% acetic acid, and the suspension is heated at boiling temperature for 3 hours. The yellow-coloured precipitate is subsequently filtered off with suction, washed with water, and dried. 14 g of a reddish-yellow pigment are obtained.

EXAMPLE 2

15 g nickel chloride hexahydrate are dissolved in 100 ml of water, 1 g of the product of 1 mol oleyl alcohol and 20 mol ethylene oxide, and 9 g benzene sulphazide are added, and the mixture is emulsified. A solution of 12.8 g barbituric acid in 200 ml of water, and 20 ml of a 40% sodium hydroxide solution are slowly added to the emulsion at 50°C. When the addition is completed, a further 5 ml of sodium hydroxide solution are added, the pH value is thus adjusted to 9, and the reaction mixture is heated at boiling temperature for 1 hour. The yellow precipitate is then isolated hot, rinsed with water, and the yellow nickel complex of azo-barbituric acid is dried. 23 g of a yellow pigment are obtained.

EXAMPLE 3

An emulsion of 34 g copper sulphate pentahydrate in 100 ml of water, 45 ml of a saturated ammonia solution, 2 g alkylsulphonate, 9 g benzene sulphazide, is mixed with a solution of 12.8 barbituric acid, 200 ml of water and 10 ml of ammonia solution and the mixture is stirred at 70°C for 6 hours. The reaction mixture is subsequently heated at boiling temperature for 2 hours, the brown precipitate is filtered off with suction and washed. After drying, there are obtained 23.4 g of the copper complex of azo-barbituric acid in the form of a brown pigment.

Yellowish or reddish brown pigments are likewise obtained by using 17 g and 0.5 g, respectively, of copper sulphate pentahydrate for the complex formation.

EXAMPLE 4

A solution of 25 g iron(III) chloride hexahydrate in 100 ml of water is combined with a solution of 12.8 g barbituric acid in 200 ml of water, 1 g alkylsulphonate is added, and 9 g benzene-sulphazide are introduced into this mixture.

After neutralising with 50 ml of a 20% sodium acetate solution, the reaction mixture is heated at boiling temperature for 5 hours. The brown precipitate is filtered off with suction and washed with water.

After drying, there are obtained 23 g of the iron complex of azo-barbituric acid in the form of a brown pigment.

A brown pigment dyestuff is likewise obtained when the iron(III) chloride is replaced in the present Example with 25 g iron(II) sulphate, the further procedure being as described above.

EXAMPLE 5

A solution of 20 g cadmium chloride hydrate in 100 ml of water is mixed with 30 ml of an ammonia solution and 1 g alkylsulphonate. A solution of 12.8 g barbituric acid in 200 ml of water, and 25 ml of an ammonia solution are subsequently added. 9 g benzene sulphazide are added dropwise with vigorous stirring, and the reaction mixture is heated at boiling temperature for about 10 hours. It is subsequently neutralised at 95°C with 5 ml of 50% acetic acid and stirred at 95°C for another hour; the yellow precipitate is subsequently filtered off with suction, washed and dried.

20.7 g of the cadmium salt of azo-barbituric acid are obtained in the form of a yellow pigment.

When the procedure described in Examples 1 to 5 is followed, but the salts there mentioned are replaced with the derivatives specified in the following Table, then there are obtained the corresponding azo-barbituric acid salts or complexes with the colours given in the Table.

| Metal salt | Colour of pigment |
| --- | --- |
| chromium(III) chloride | yellowish brown |
| cobalt chloride | brown |
| barium chloride | orange |
| zinc chloride | yellow |
| manganese sulphate | yellowish brown |
| magnesium chloride | yellow |
| calcium chloride | yellow |
| aluminium sulphate | reddish yellow |

Mixtures:
 cadmium chloride/nickel chloride yellow
 copper sulphate/nickel chloride yellowish brown The same pigments are obtained in corresponding yields when the benzene sulphazide is replaced in the above Examples with equivalent amounts of p-toluene-sulphonyl azide, carbamoyl azide, azido-formic acid methyl ester or dimethylamino-monosulphonic acid azide.

EXAMPLE 6

A mixture of 3.28 g barbituric acid dihydrate and 3.08 g diazo-barbituric acid are heated together with 1 g alkylsulphonate in 50 ml of a 2N sodium hydroxide solution to boiling temperature, and the reaction mixture is stirred at the same temperature for about 5 hours. It is then acidified with concentrated hydrochloric acid, the product is filtered off with suction while hot and washed with water until neutral.

After drying, there are obtained 5 g azo-barbituric acid in the form of a reddish yellow pigment.

The azo-barbituric acid pigment is also obtained in analogy with Examples 1 to 5 by heating a solution of barbituric acid with the azides mentioned above in a weakly alkaline suspension with the addition of emulsifiers.

EXAMPLE 7

5 g of azo-barbituric acid are dispersed in 100 ml of water with 1 g of emulsifier, and a solution of 5 g copper sulphate pentahydrate in 30 ml of water and 30 ml of a concentrated ammonia solution are added. The reaction mixture is then heated at boiling temperature for 3 hours, subsequently adjusted to pH 5 by the addition of dilute acetic acid, the product is isolated hot and washed with water until neutral.

After drying, there is obtained the copper complex of azo-barbituric acid in the form of a brown pigment the properties of which correspond to those of the product obtained according to Example 3.

The same dyestuff is obtained when the coupling of diazo-barbituric acid with barbituric acid described in Example 6 is carried out in the presence of a copper sulphate solution in an ammoniacal medium.

EXAMPLE 8

A. 8 Parts of the strontium salt of azo-barbituric acid obtained according to Example 1 are ground with a stoving varnish prepared from 25 parts coconut oil alkyd resin, (40% coconut oil), 10 parts melamine resin, 50 parts toluene and 7 parts glycol monomethyl ether in an automatic HOOVER-MULLER grinding machine. The mixture is applied to the substrate to be varnished, the varnish is hardened by stoving at 130°C, and there are obtained reddish yellow, well-covering varnish coatings of very good fastness to cross-varnishing, outstanding fastness to light and weather, and high brilliancy.

Pigmented stoving varnishes of the same fastness properties are obtained by using 15 to 25 parts of the stated alkyd resin or of an alkyd resin derived from cotton seed oil, castor oil or synthetic fatty acids, and replacing the stated amount of melamine resin with 10 to 15 parts of the above melamine resin or of a condensation product of formaldehyde with urea or benzoguanamine. Pigmented stoving varnishes of similar good fastness properties and with a greenish yellow shade are obtained when the stated pigment is replaced with the corresponding amount of the nickel complex of azo-barbituric acid obtained according to Example 2.

When the varnish mentioned above is ground, instead of with the stated amount of pigment, with 1 to 10 parts of a mixture of titanium dioxide (rutile type) with the pigment obtained according to Example 2 in a proportion of 0.5–50 : 1 and working up is carried out in the same way, then varnish coatings are obtained which have the same fastness properties and a yellow shade which is shifted towards white as the content of titanium dioxide increases. Varnishes of similar fastness properties are obtained with the use of physically drying spirit varnish, colourless nitrocellulose varnish and nitro varnishes; of air-drying oil, synthetic resin and nitro-combination varnishes; oven- and air-drying epoxide resin varnishes, optionally in combination with urea, melamine, alkyd or phenol resins.

When reaction varnishes derived from an unsaturated polyester resin, or amine-hardening epoxide resin varnishes with dipropylene-triamine as amine component are used, then yellow varnish coatings of outstanding fastness to weather and efflorescence are obtained. Pigmentations of similar fastness properties are obtained with the use of other two-component varnishes derived from aromatic or aliphatic isocyanates and polyethers or polyesters containing hydroxyl groups, as well as with moisture-drying polyisocyanate varnishes yielding polyurea varnish coatings.

B. 30 Parts of the pigment powder obtained according to Example 3 are kneaded with 10 parts of an ethoxylated alkylphenol in a dispersion kneader, e.g., system WERNER and PFLEIDERER, and subsequently diluted with 60 parts of water while kneading. Instead of the dispersion kneader, it is also possible to use a ball mill or a high-speed mixer ball mill charged with grinding elements of 0.1 to 0.8 mm diameter as comminution aggregate.

5 Parts of this fine paste are mixed with 10 parts of barite as filler, 10 parts titanium dioxide (rutile type) as white pigment and 40 parts of an aqueous emulsion paint containing about 50% polyvinyl acetate. The paint is spread and after drying there are obtained brown coatings of very good fastness to lime and cement and outstanding fastness to weather and light.

The fine paste so obtained is also suitable for pigmenting clear polyvinyl acetate emulsion paints; for emulsion paints containing copolymers of styrene and maleic acids as binding agents; as well as for emulsion paints derived from polyvinyl propionate, polymethacrylate or butadiene-styrene; and for wall-paper staining colours based on size with chalk.

Coatings of a similar, somewhat more yellow shade and of similar fastness properties are obtained when the above pigment is replaced with corresponding amounts of the pigment obtained according to Example 4.

Other non-ionic emulsifiers may also be used as dispersing agents, such as the reaction products of nonylphenol with ethylene oxide; or ionic wetting agents, such as the sodium salts of alkylaryl-sulphonic acids, e.g., of dinaphthyl-methane-disulphonic acid; sodium salts of substituted sulpho-fatty acid esters; and sodium salts of paraffin-sulphonic acids in combination with alkyl polyglycol ethers.

C. A mixture of 65 parts polyvinyl chloride, 35 parts diiso-octyl phthalate, 2 parts dibutyl-tin mercaptide, 0.5 parts titanium dioxide and 0.5 parts of the pigment obtained according to Example 5 is coloured in a roll mill at 165°C. A greenish yellow mass is obtained which can serve for the production of foils or moulded bodies.

The dyeing is characterised by outstanding fastness to light, very good fastness to plasticisers and by high brilliancy.

Yellow or brown mouldings of high brilliancy and very good fastness to light and migration are obtained when 0.2 parts of the above pigment are mixed with 100 parts polyethylene, polypropylene or polystyrene granulate, and the mixture is immediately injection-moulded at 220°C to 280°C in an injection moulding machine or worked up in an extruder into coloured rods or in a roll mill into coloured rough sheets. The rough sheets or rods are granulated, if desired, and injection-moulded in an injection moulding machine.

Synthetic polyamides of caprolactam or adipic acid and hexamethylene-diamine, or condensation products of terephthalic acid and ethylene glycol can be coloured in a similar way at 280° to 300°C, possibly in a nitrogen atmosphere.

When 1 part of the pigment obtained according to Example 3 is mixed with 10 parts titanium dioxide (rutile type) and 100 parts of a copolymer based on acrylonitrile/butadiene/styrene and present in powdered form, and the mixture is coloured at 140° to 180°C in a roll mill, then a brown rough sheet is obtained which is granulated and injection-moulded in an injection moulding machine at 200° to 250°C. Brown mouldings of very good fastness to light and migration and of excellent thermal stability and colour saturation are obtained.

Synthetic materials based on cellulose acetate, cellulose butyrate and mixtures thereof are dyed in a similar way but at temperatures of 180° to 220°C.

A yellow transparent granulate of outstanding fastness to light and thermal stability and of high brilliancy is obtained when 0.2 parts of the pigment of Example 2 are mixed with 100 parts of a synthetic material based on polycarbonate in an extruder or in a screwkneader at 250° to 280°C, and the mixture is worked up into a granulate.

D. 90 Parts of a weakly branched polypropylene glycol with a molecular weight of 2,500 and a hydroxyl number of 56, 0.23 parts endoethylene-piperazine, 0.3 parts tin(II) octoate, 1.0 part of a polyether siloxane, 3.5 parts of water, 12.0 parts of a paste of 10 parts of the pigment obtained according to Example 6 ground with 50 parts of the stated polypropylene glycol, are well mixed and subsequently intimately mixed with 45 parts toluylene diisocyanate (80% 2,4- and 20% 2,6-isomer) and poured into a mould. The mixture becomes cloudy after 6 seconds and foam formation occurs. After 70 seconds, an intensely orange-coloured soft polyurethane foam has formed the pigmentation of which exhibits outstanding fastness to light and brilliancy.

A yellow polyurethane soft foam with a pigmentation of the same fastness to light is obtained when 90 parts of a weakly branched polyester of adipic acid, diethylene glycol and trimethylol-propane with a molecular weight of 2,000 and a hydroxyl number of 60 is mixed with the following components: 1.2 parts dimethyl benzylamine, 2.5 parts sodium castor oil sulphate, 2.0 parts of an ethoxylated benzylated hydroxy-diphenyl, 1.75 parts of water, 12 parts of a paste prepared by grinding 10 parts of the pigment obtained according to Example 2 with 50 parts of the polyester mentioned above, and, after mixing with stirring, 40 parts toluylene diisocyanate (65% 2,4- and 35% 2,6-isomer) are added with stirring, the mixture is poured into a mould and diluted.

Yellow or brown polyurethane soft foams with a pigmentation of similar fastness to light are obtained when the above pigment is replaced with the same amount of the pigment obtained according to Example 5, Table.

E. A printing ink prepared by grinding 35 parts of the pigment obtained according to Example 5 and 65 parts of linseed oil with the addition of 1 part of a desiccator (Co-naphthenate, 50% in test benzine) yields yellow offset prints of high brilliancy and strength of colour and of very good fastness to light and varnishing. The use of this printing ink in book printing, heliography, lithography or steel engraving leads to yellow prints of similar fastness properties. When the pigment is used for colouring tin printing inks or intaglio inks or printing inks of low viscosity, then yellow prints of similar fastness properties are obtained.

F. A printing paste is prepared from 10 parts of the pigment fine paste mentioned in Example 8(B), 100 parts of 3% tragacanth, 100 parts of an aqueous 50% egg albumin solution, and 25 parts of a non-ionic wetting agent. A textile fibre fabric is printed, steamed at 100°C, and there is obtained a brown print which is characterised by excellent fastness properties, especially fastness to light, and high brilliancy. Instead of tragacanth and egg albumin, other binding agents suitable for fixing on the fibres may be used, for example, those based on synthetic resin, British gum of cellulose glycolate.

G. A mixture of 100 parts crepe light, 2.6 parts of sulphur, 1 part stearic acid, 1 part mercaptobenzothiazole, 0.2 parts hexamethylene-tetramine, 5 parts zinc oxide, 60 parts of chalk and 2 parts titanium dioxide (anatase type) is coloured in a roll mill at 50°C with 2 parts of the pigment obtained according to Example 6, and then vulcanized at 140°C for 12 minutes. An orange-coloured vulcanisation product of very good fastness to light is obtained.

H. 22,500 Parts of an aqueous approximately 9% viscose solution are added in an agitator-mixer to 100 parts of a 20% aqueous fine paste prepared as in Example 8(B). The coloured mass is stirred for 15 minutes, subsequently de-aerated and subjected to a spinning and de-sulphurizing process. Brown filaments or foils of very good fastness to light are obtained.

Yellow pigmented filaments or foils of similar fastness properties are obtained when a 20% solution of acetyl-cellulose in acetone, or a 15 – 25% solution of polyacrylonitrile in dimethyl formamide, coloured with the pigment dyestuffs prepared according to Example 2 or 5, is subjected to a dry spinning process.

I. 10,000 Parts of a paper pulp containing, per 100 parts, 4 parts cellulose, are treated in a hollander for about 2 hours. During this period of time there is added, at intervals of 15 minutes, 4 parts of resin size, then 30 parts of an approximately 15% pigment dispersion obtained as in Example 8(B) with dinaphthylmethane sulphonate as dispersing agent, then 5 parts aluminium sulphate. After finishing in a paper machine, a brown-coloured paper of outstanding fastness to light and solvents is obtained.

K. The brown pigmented papers produced according to Example 8(I) are impregnated with a 55% solution of an urea-formaldehye resin in n-butanol, and stoved at 140°C. Brown laminated papers of very good fastness to migration and outstanding fastness to light are obtained.

A laminated paper of the same fastness properties is obtained by laminating a paper which has been printed by intaglio printing with a printing ink containing one of the pigment fine pastes mentioned in Example 8(E) and water-soluble or hydrolysable binding agents.

I claim:

1. A polyvalent metal salt or a polyvalent metal complex of azo-barbituric acid; prepared from 1 mole of azo-barbituric acid and about ½ to about 3 moles of a polyvalent metal salt; wherein said polyvalent metal is selected from the group consisting of magnesium, barium, strontium, aluminum, zinc, manganese, iron, cobalt, nickel, copper and cadmium.

2. A polyvalent metal salt or a polyvalent metal complex of azo-barbituric acid of claim 1 wherein said metal is selected from the group consisting of barium, nickel, cadmium, copper and iron.

3. A polyvalent metal salt or a polyvalent metal complex of azo-barbituric acid of claim 1 wherein the metal is nickel.

4. A polyvalent metal salt or a polyvalent metal complex of azo-barbituric acid of claim 1 wherein the metal is barium.

* * * * *